United States Patent
Song

(10) Patent No.: US 12,179,532 B2
(45) Date of Patent: Dec. 31, 2024

(54) SUSPENSION FOR VEHICLE

(71) Applicant: HYUNDAI MOBIS Co., Ltd., Seoul (KR)

(72) Inventor: Woo Bin Song, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 374 days.

(21) Appl. No.: 17/857,270

(22) Filed: Jul. 5, 2022

(65) Prior Publication Data

US 2023/0020086 A1 Jan. 19, 2023

(30) Foreign Application Priority Data

Jul. 6, 2021 (KR) .................. 10-2021-0088450

(51) Int. Cl.
*B60G 11/20* (2006.01)
*B60G 11/12* (2006.01)

(52) U.S. Cl.
CPC .................................. *B60G 11/12* (2013.01)

(58) Field of Classification Search
CPC .................................................... B60G 11/12
USPC .......... 267/36.1, 38, 40, 46–48, 51–53, 260, 267/263, 269–271; 280/124.17, 124.174, 280/124.175
See application file for complete search history.

(56) References Cited

U.S. PATENT DOCUMENTS

| | | | | |
|---|---|---|---|---|
| 169,885 A * | 11/1875 | Barnecott | ............ | B60G 11/42 267/40 |
| 1,183,725 A * | 5/1916 | Cook | .................. | B60G 11/36 267/48 |
| 2,035,937 A * | 3/1936 | Anderson | ............ | B60G 11/38 280/124.171 |
| 3,227,468 A * | 1/1966 | Raidel | .................. | B60G 5/047 280/682 |
| 7,246,808 B2 * | 7/2007 | Preijert | .................. | B60G 5/04 280/124.17 |
| 7,296,821 B2 * | 11/2007 | Fenton | ................. | B60G 5/047 280/682 |
| 9,969,229 B2 * | 5/2018 | Soles | .................... | B60G 11/10 |
| 11,890,906 B2 * | 2/2024 | Kim | .................... | F16F 1/3683 |

FOREIGN PATENT DOCUMENTS

KR 10-2015-0113250 A 10/2015

* cited by examiner

*Primary Examiner* — Christopher P Schwartz
(74) *Attorney, Agent, or Firm* — Morgan, Lewis & Bockius LLP

(57) ABSTRACT

A suspension for a vehicle may include: a main frame; a lower leaf spring installed on either side of the main frame; an upper leaf spring disposed above the lower leaf spring so as to be spaced apart from the lower leaf spring; a connection bracket supported by the upper leaf spring, and rotatably mounted on the main frame; an eye clip mounted on an end portion of the lower leaf spring, and connected to a wheel; and a rubber bush mounted on either side of the upper leaf spring, and connected to a vehicle body.

11 Claims, 9 Drawing Sheets

SUSPENSION FOR VEHICLE

CROSS-REFERENCE TO RELATED APPLICATION

This application claims the benefit under 35 U.S.C. § 119(a) of priority to Korean Patent Application No. 10-2021-0088450 filed on Jul. 6, 2021 in the Korean Intellectual Property Office, the entire disclosure of which is incorporated herein by reference for all purposes.

BACKGROUND

Technical Field

Exemplary embodiments of the present disclosure relate to a suspension for a vehicle, and more particularly, to a suspension for a vehicle, which can reduce the assembly time and the weight of a vehicle.

Discussion of the Background

In general, a suspension for a vehicle connects an axle and a vehicle body, and absorbs and buffers shock or vibration applied to the axle from the road during driving, such that the shock or vibration is not directly transferred to the vehicle body, thereby improving ride comfort while preventing damage to the vehicle body and luggage.

Such a suspension may be classified into a conventional suspension using the elastic force of a coil spring and a leaf spring suspension using the elastic force of a leaf spring, according to a method for buffering shock applied from the road.

The conventional suspension has a structure that performs a functional operation with various parts, and thus requires a large number of operations during an assembly process. Furthermore, since a large number of parts are required, the weight of a product is increased. The coil spring has a structure that stands in the height direction of the vehicle and supports the weight of the vehicle. The coil spring occupies a large volume in the suspension at the lower part of the vehicle. Furthermore, the coil spring requires a separate space for mounting a shock absorber, and thus reduces the interior space of the vehicle. Therefore, there is a need for a device capable of solving the problem.

The related art of the present disclosure is disclosed in Korean Patent Application Publication No. 10-2015-0113250 published on Oct. 8, 2015 and entitled "Leaf Spring Suspension."

SUMMARY

Various embodiments are directed to a suspension for a vehicle, which can reduce the assembly time and the weight of the vehicle.

In an embodiment, a suspension for a vehicle may include: a main frame; a lower leaf spring installed on either side of the main frame; an upper leaf spring disposed above the lower leaf spring so as to be spaced apart from the lower leaf spring; a connection bracket supported by the upper leaf spring, and rotatably mounted on the main frame; an eye clip mounted on an end portion of the lower leaf spring; and a rubber bush mounted on either side of the upper leaf spring.

The lower leaf spring may include: a first lower leaf spring installed on one side of the main frame; and a second lower leaf spring spaced apart from the first lower leaf spring, and installed on another side of the main frame. The main frame may include: a first main frame on which the first lower leaf spring is installed; and a second main frame having one side which is link-connected to the first main frame and another side on which the second lower leaf spring is installed.

The connection bracket may include: a connection bracket body configured to surround an outer surface of the upper leaf spring; an extension extended from the connection bracket body toward the main frame; and a pin configured to connect the extension, the first main frame, and the second main frame.

The first lower leaf spring and the second lower leaf spring may have a curved shape so as to be elastically deformable.

The upper leaf spring may have a curved shape so as to be elastically deformable.

The eye clip may include: an eye clip body part connected to the wheel; and an eye clip accommodation part concavely disposed at an end portion of the eye clip body part, and configured to accommodate the lower leaf spring.

The rubber bush may include: a rubber bush bracket mounted on an end portion of the upper leaf spring; a rubber bush column passed through the upper leaf spring, and mounted on the rubber bush bracket; a rubber bush cover mounted on an outer surface of the rubber bush column; and an elastic part interposed between the rubber bush cover and the upper leaf spring, and elastically deformed by the upper leaf spring.

The elastic part may be made of rubber.

The eye clip may be made of aluminum.

The eye clip may be configured to be connected to a wheel.

The rubber bush may be configured to be connected to a vehicle body.

The suspension for a vehicle in accordance with the embodiment of the present disclosure may perform a damper function of absorbing shock of the vehicle, which makes it possible to reduce the number of parts, the number of assembly operations, and the assembly time.

Furthermore, in accordance with the present disclosure, the reduction in the number of parts may decrease the weight of the product, and improve the fuel efficiency of the vehicle.

Furthermore, the suspension for a vehicle in accordance with the present disclosure does not require a separate space for mounting a shock absorber, which makes it possible to expand the interior space of the vehicle.

DETAILED DESCRIPTION OF THE ILLUSTRATED EMBODIMENTS

Hereinafter, a suspension for a vehicle will be described below with reference to the accompanying drawings through various exemplary embodiments. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
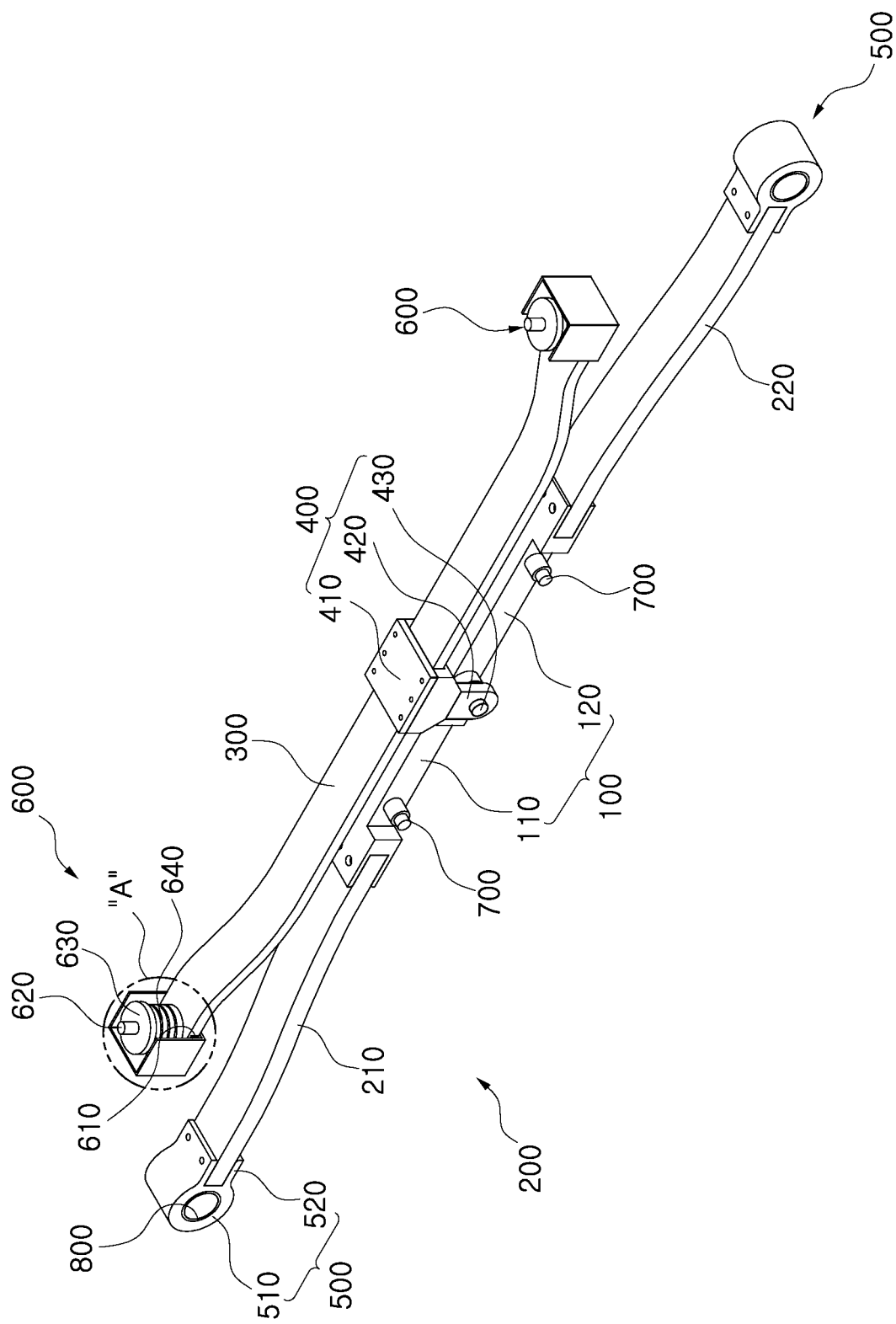
FIG. 1 is a perspective view schematically illustrating a suspension for a vehicle in accordance with an embodiment of the present disclosure.
Figure 2:
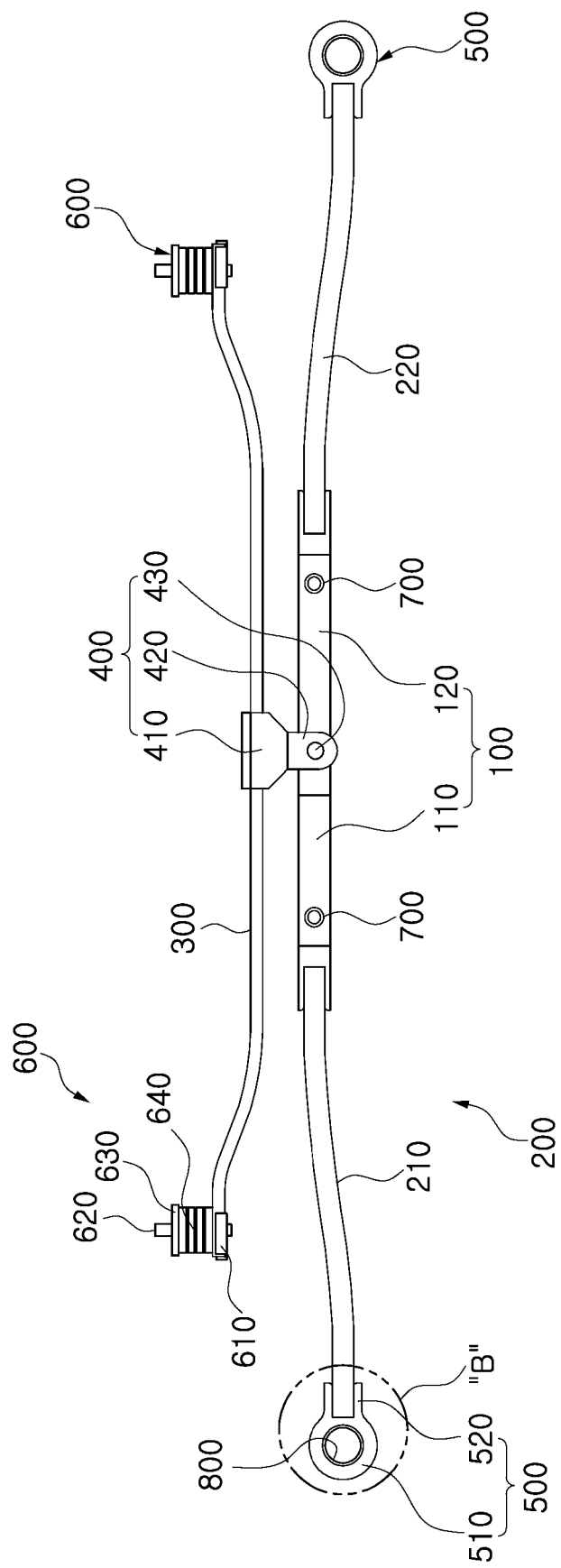
FIG. 2 is a front view schematically illustrating the suspension for a vehicle in accordance with the embodiment of the present disclosure.
Figure 3:
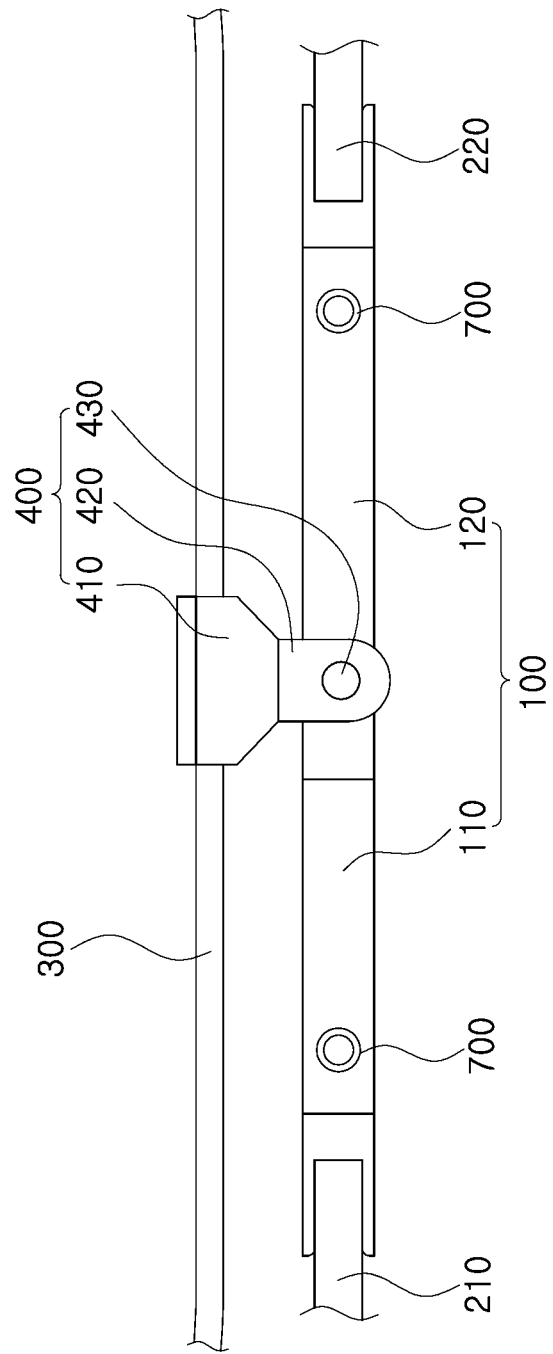
FIG. 3 is a front view schematically illustrating a main frame, a lower leaf spring, and an upper leaf spring in accordance with the embodiment of the present disclosure.
Figure 4:
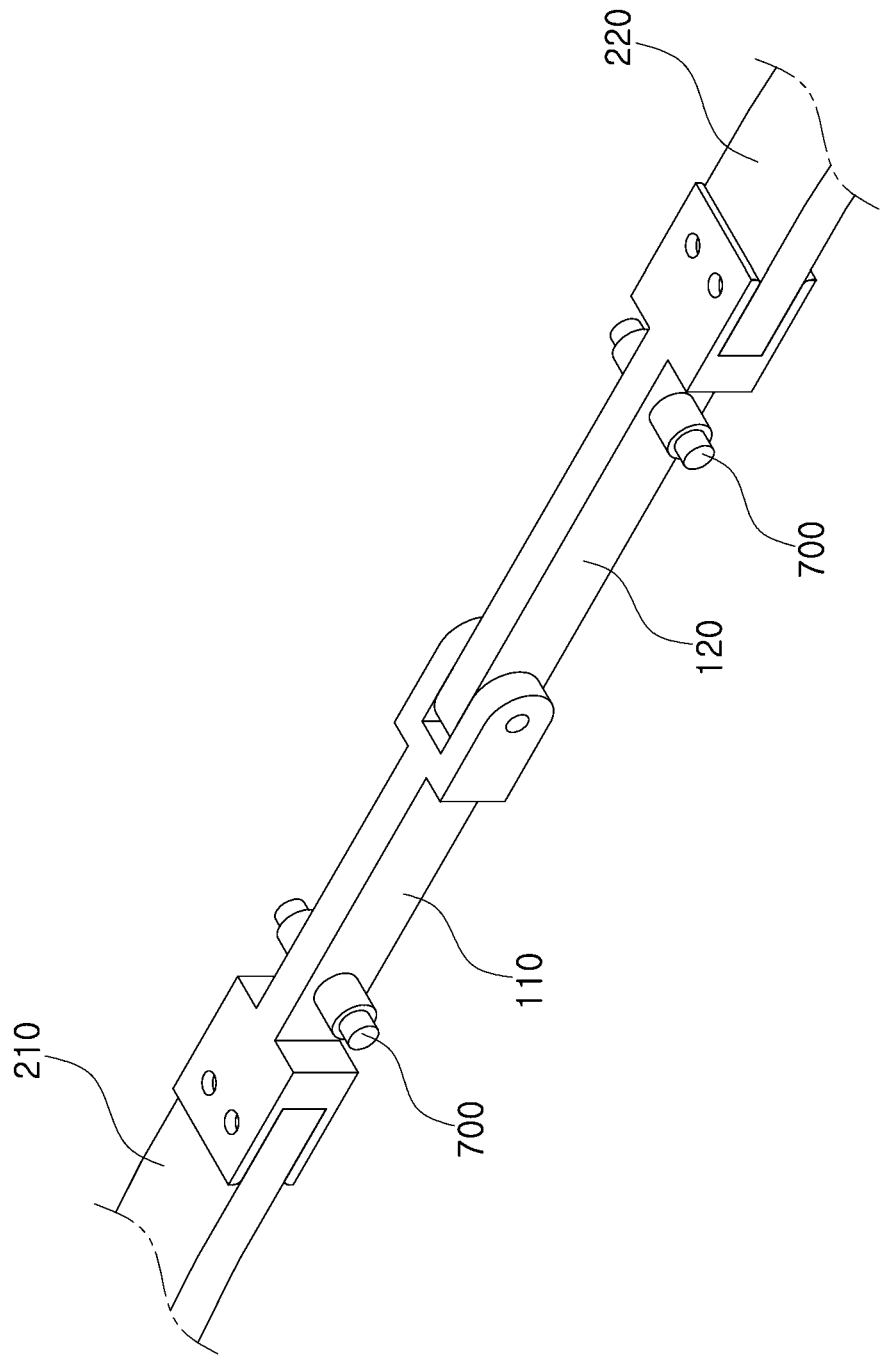
FIG. 4 is a perspective view schematically illustrating the main frame and the lower leaf spring in accordance with the embodiment of the present disclosure.
Figure 5:
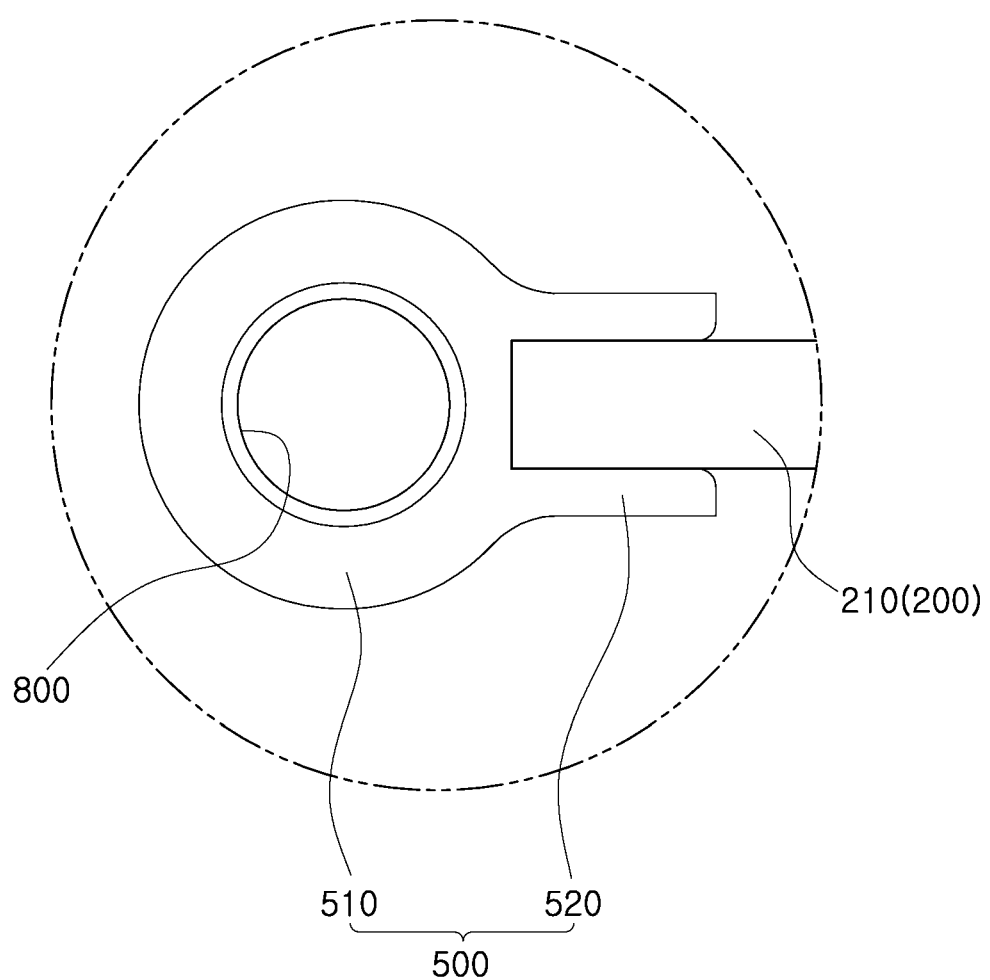
FIG. 5 is a partially expanded front view schematically illustrating a portion "B" of FIG. 2.
Figure 6:
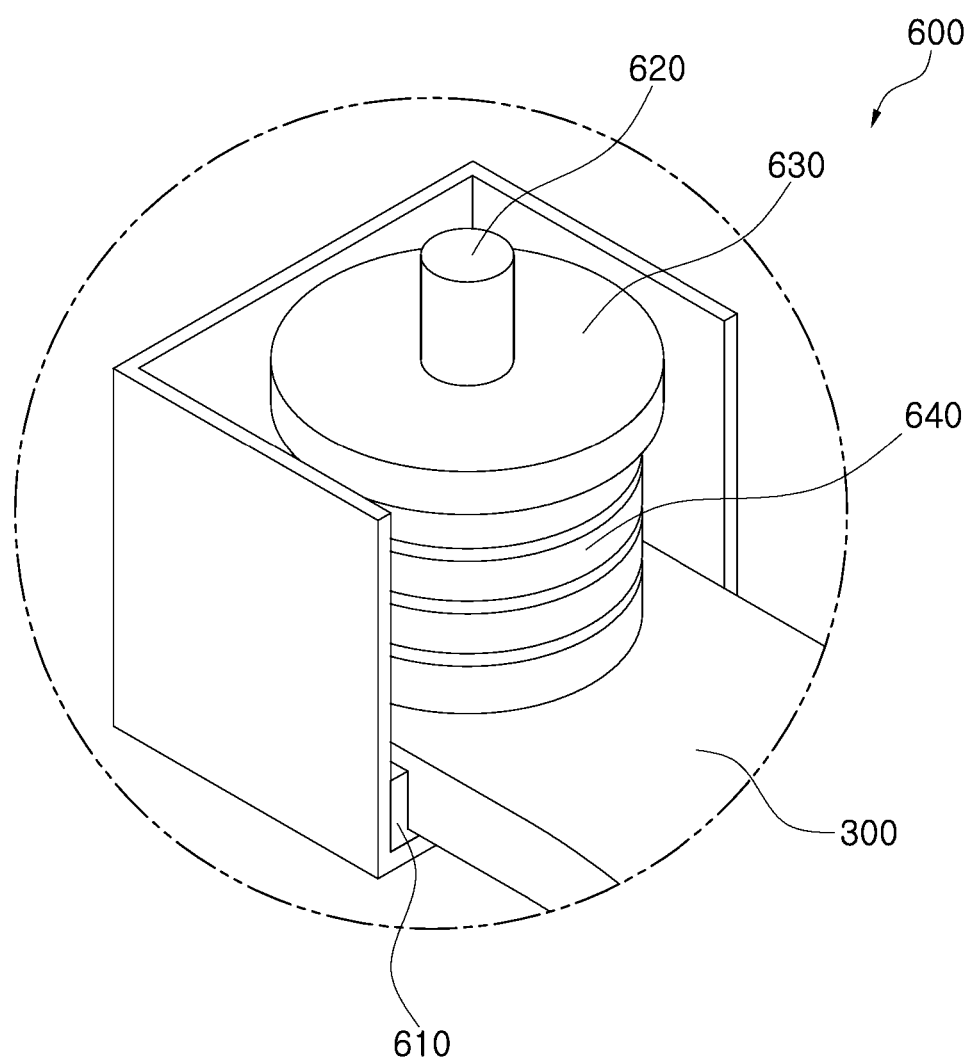
FIG. 6 is a partially expanded perspective view illustrating a portion "A" of FIG. 1.
Figure 7:
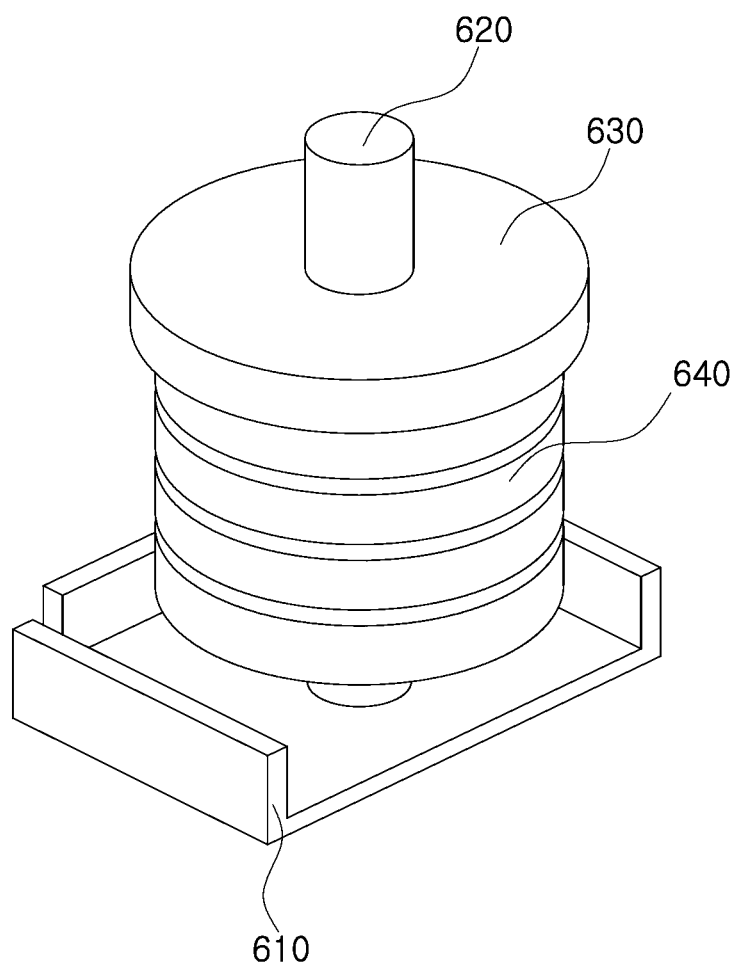
FIG. 7 is a perspective view schematically illustrating a rubber bush in accordance with the embodiment of the present disclosure.
Figure 8:
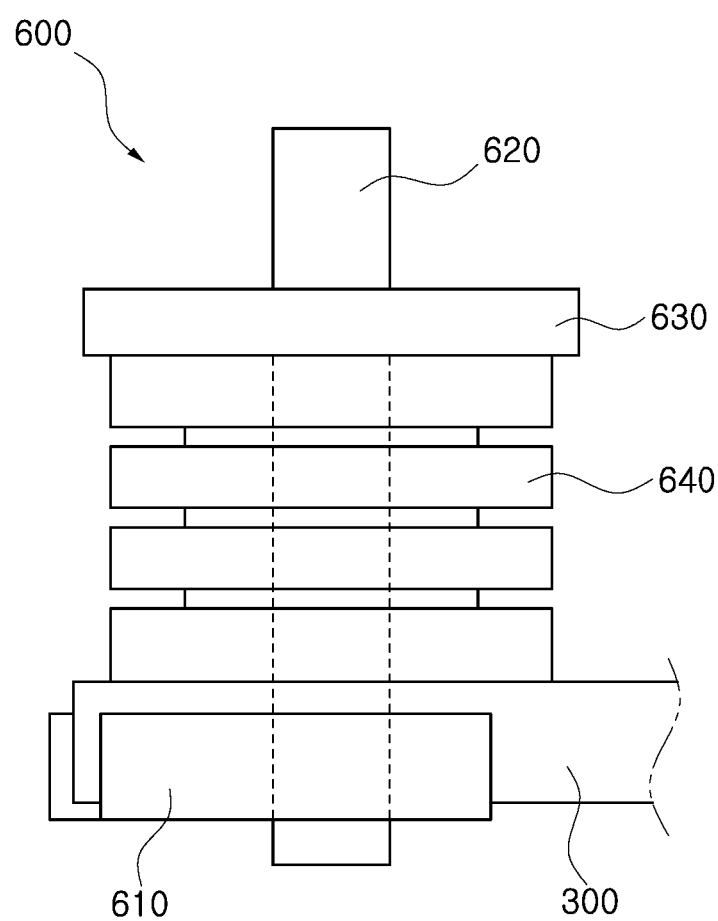
FIG. 8 is a front view schematically illustrating the rubber bush in accordance with the embodiment of the present disclosure.
Figure 9:
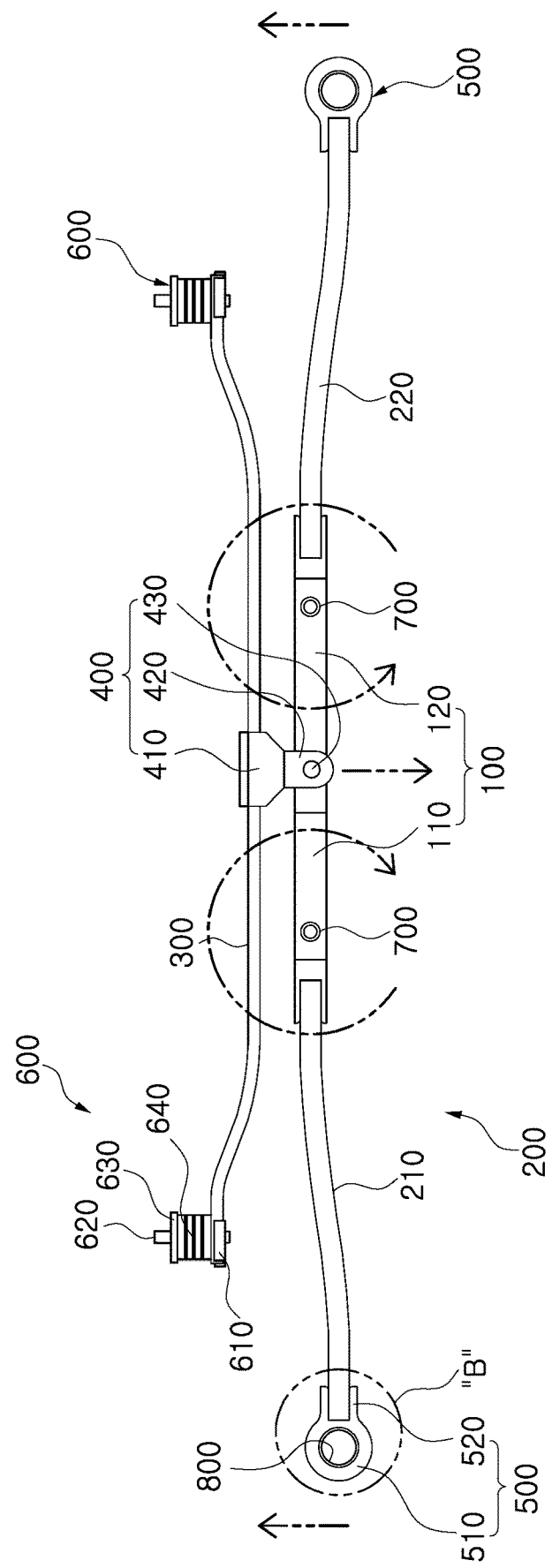
FIG. 9 is a front view schematically illustrating an operation of the suspension for a vehicle in accordance with the embodiment of the present disclosure.

FIG. 1 is a perspective view schematically illustrating a suspension for a vehicle in accordance with an embodiment of the present disclosure, FIG. 2 is a front view schematically illustrating the suspension for a vehicle in accordance with the embodiment of the present disclosure, FIG. 3 is a front view schematically illustrating a main frame, a lower leaf spring, and an upper leaf spring in accordance with the embodiment of the present disclosure, FIG. 4 is a perspective view schematically illustrating the main frame and the lower leaf spring in accordance with the embodiment of the present disclosure, FIG. 5 is a partially expanded front view schematically illustrating a portion "B" of FIG. 2, FIG. 6 is a partially expanded perspective view illustrating a portion "A" of FIG. 1, FIG. 7 is a perspective view schematically illustrating a rubber bush in accordance with the embodiment of the present disclosure, FIG. 8 is a front view schematically illustrating the rubber bush in accordance with the embodiment of the present disclosure, and FIG. 9 is a front view schematically illustrating an operation of the suspension for a vehicle in accordance with the embodiment of the present disclosure.

Referring to FIGS. 1 to 9, the suspension for a vehicle in accordance with the embodiment of the present disclosure includes a main frame 100, a plurality of lower leaf springs 200, an upper leaf spring 300, a connection bracket 400, a plurality of eye clips 500, and a plurality of rubber bushes 600.

The lower leaf spring 200 is installed on either side of the main frame 100, and the connection bracket 400 is mounted on a central portion of the main frame 100.

The main frame 100 includes a first main frame 110 and a second main frame 120. A first lower leaf spring 210 of the lower leaf spring 200 is installed on one side (left side in FIG. 2) of the first main frame 110.

The first main frame 110 is formed in a U-shape whose one side is open, and accommodates the first lower leaf spring 210. The first main frame 110 and the first lower leaf spring 210 are fastened to each other through bolting or the like.

The second main frame 120 has one side (left side in FIG. 2) which is link-connected to the first main frame 110 and the other side (right side in FIG. 2) on which a second lower leaf spring 220 is installed. The second main frame 120 is link-connected to the first main frame 110, and rotatably connected to the connection bracket 400.

The second main frame 120 is formed in a U-shape whose the other side is open, and accommodates the second lower leaf spring 220. The second main frame 120 and the second lower leaf spring 220 are fastened to each other through bolting or the like.

The lower leaf spring 200 is installed on either side of the main frame 100. The lower leaf spring 200 includes the first lower leaf spring 210 and the second lower leaf spring 220.

The first lower leaf spring 210 is installed on one side (right side in FIG. 1) of the first main frame 110. The second lower leaf spring 220 is spaced apart from the first lower leaf spring 210, and installed on the other side (left side in FIG. 2) of the second main frame 120.

The first lower leaf spring 210 and the second lower leaf spring 220 may be formed in a curved shape so as to be elastically deformable, and thus absorb and reduce shock applied from the outside.

The upper leaf spring 300 is disposed above the lower leaf spring 200 so as to be spaced apart from the lower leaf spring 200. The upper leaf spring 300 is connected to the first main frame 110 and the second main frame 120 of the main frame 100 by the connection bracket 400.

The upper leaf spring 300 may be formed in a curved shape so as to be elastically deformable, and thus absorb and reduce shock applied from the outside.

The connection bracket 400 is supported by the upper leaf spring 300, and rotatably mounted on the main frame 100. The connection bracket 400 includes a connection bracket body 410, an extension 420, and a pin 430.

The connection bracket body 410 surrounds the outer surface of the upper leaf spring 300. The connection bracket body 410 is formed in a U-shape whose one side (bottom side in FIG. 1) is open, and surrounds the outer surface of the upper leaf spring 300.

The extension 420 is extended from the connection bracket body 410 to the main frame 100. The extension 420 has a through-hole into which the pin 430 is inserted and which communicates with a link connection between the first main frame 110 and the second main frame 120.

The pin 430 connects the extension 420, the first main frame 110, and the second main frame 120. The first main frame 110 and the second main frame 120 may be rotated on the pin 430.

The eye clip 500 is mounted on an end portion of the lower leaf spring 200, and connected to a wheel (not illustrated). The eye clip 500 is mounted on each of end portions of the first and second lower leaf springs 210 and 220 of the lower leaf spring 200.

The eye clip 500 includes an eye clip body part 510 and an eye clip accommodation part 520. The eye clip body part 510 is connected to the wheel. The eye clip body part 510 is formed in a hollow shape, and connected to a rotating shaft part 800 connected to the wheel. Shock applied through the wheel is transferred to the lower leaf spring 200 through the eye clip body part 510 and the eye clip accommodation part 520 of the eye clip 500.

The eye clip accommodation part 520 is formed in a U-shape at an end of the eye clip body part 510, and accommodates the lower leaf spring 200. The eye clip accommodation part 520 is installed on each of the first and second lower leaf springs 210 and 220 of the lower leaf spring 200. The eye clip accommodation part 520 is fastened to each of the first and second lower leaf springs 210 and 220 through bolting or the like.

The eye clip 500 is made of aluminum. Since the eye clip 500 is made of aluminum which is a light metal, the eye clip 500 may reduce the weight of a product, and improve the fuel efficiency of the vehicle.

The rubber bush 600 is mounted on either side of the upper leaf spring 300, and connected to the vehicle body (not illustrated) disposed above the rubber bush 600 through welding or bolting. The rubber bush 600 attenuates shock applied from the wheel with the lower leaf spring 200 and the upper leaf spring 300, thereby reducing the shock applied to the vehicle body.

The rubber bush 600 includes a rubber bush bracket 610, a rubber bush column 620, a rubber bush cover 630, and an elastic part 640. The rubber bush bracket 610 is mounted on the end portion of the upper leaf spring 300.

The rubber bush column 620 is passed through the upper leaf spring 300, and is formed in the shape of a cylinder mounted on the rubber bush bracket 610. The rubber bush column 620 is fixed to the rubber bush bracket 610 through bolting, welding, bonding or the like.

The rubber bush cover 630 is mounted on the outer surface of the rubber bush column 620. The rubber bush cover 630 is mounted on the rubber bush column 620 through bolting, welding, bonding or the like, and prevents the separation of the elastic part 640.

The elastic part 640 is interposed between the rubber bush cover 630 and the upper leaf spring 300, and elastically deformed by the pressurization of the upper leaf spring 300. While elastically deformed between the rubber bush cover 630 and the upper leaf spring 300 by the pressurization of the upper leaf spring 300, the elastic part 640 absorbs shock such that shock applied to the vehicle body is reduced.

The elastic part 640 is made of an elastically deformable material such as rubber. The elastic part 640 made of rubber may be easily mounted, and absorb shock.

In the present disclosure, a bush part 700 is mounted in each of the first and second main frames 110 and 120 of the main frame 100. The bush part 700 may be made of an elastically deformable material, and absorb shock transferred from the outsides of the first main frame 110 and the second main frame 120.

Hereafter, the operation of the suspension for a vehicle in accordance with the embodiment of the present disclosure will be described with reference to FIG. 9.

During a normal operation, the first lower leaf spring 210 and the second lower leaf spring 220 of the lower leaf spring 200 and the upper leaf spring 300 generate a spring force in a top-to-bottom direction to support the vehicle body.

During the counter phase, larger shock is generated in the first lower leaf spring 210 than in the second lower leaf spring 220, such that the left eye clip 500 rises. As the left eye clip 500 rises, the first lower leaf spring 210 is rotated in one direction (clockwise direction in FIG. 9) on the connection bracket 400. The connection bracket 400 is operated downward.

At this time, the second lower leaf spring 220 is rotated in the other direction (counterclockwise direction in FIG. 9) on the connection bracket 400. Thus, the right eye clip 500 connected to the second lower leaf spring 220 also rises. Therefore, when the vehicle rolls, the suspension for a vehicle in accordance with the present disclosure performs a stabilizer function of applying a force to restore the vehicle.

The suspension for a vehicle in accordance with the embodiment of the present disclosure may perform a damper function of absorbing shock of the vehicle, which makes it possible to reduce the number of parts, the number of assembly operations, and the assembly time.

Furthermore, in accordance with the present disclosure, the reduction in the number of parts may decrease the weight of the product, and improve the fuel efficiency of the vehicle.

Furthermore, the suspension for a vehicle in accordance with the present disclosure does not require a separate space for mounting a shock absorber, which makes it possible to expand the interior space of the vehicle.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A suspension for a vehicle, comprising:
   a main frame;
   a lower leaf spring installed on either side of the main frame;
   an upper leaf spring disposed above the lower leaf springs so as to be spaced apart from the lower leaf springs;
   a connection bracket supported by the upper leaf spring, and rotatably mounted on the main frame;
   an eye clip mounted on an end portion of the lower leaf springs; and
   a rubber bush mounted on either side of the upper leaf spring.

2. The suspension of claim 1, wherein the lower leaf spring comprises:
   a first lower leaf spring installed on one side of the main frame; and
   a second lower leaf spring spaced apart from the first lower leaf spring, and installed on another side of the main frame,
   wherein the main frame comprises:
   a first main frame on which the first lower leaf spring is installed; and
   a second main frame having one side which is link-connected to the first main frame and another side on which the second lower leaf spring is installed.

3. The suspension of claim 2, wherein the connection bracket comprises:
   a connection bracket body configured to surround an outer surface of the upper leaf spring;
   an extension extended from the connection bracket body toward the main frame; and
   a pin configured to connect the extension, the first main frame, and the second main frame.

4. The suspension of claim 2, wherein the first lower leaf spring and the second lower leaf spring have a curved shape so as to be elastically deformable.

5. The suspension of claim 1, wherein the upper leaf spring has a curved shape so as to be elastically deformable.

6. The suspension of claim 1, wherein the eye clip comprises:
   an eye clip body part connected to the wheel; and
   an eye clip accommodation part concavely disposed at an end portion of the eye clip body part, and configured to accommodate the lower leaf spring.

7. The suspension of claim 1, wherein the rubber bush comprises:
   a rubber bush bracket mounted on an end portion of the upper leaf spring;
   a rubber bush column passed through the upper leaf spring, and mounted on the rubber bush bracket;

a rubber bush cover mounted on an outer surface of the rubber bush column; and an elastic part interposed between the rubber bush cover and the upper leaf spring, and elastically deformed by the upper leaf spring.

8. The suspension of claim 7, wherein the elastic part is made of rubber.

9. The suspension of claim 1, wherein the eye clip is made of aluminum.

10. The suspension of claim 1, wherein the eye clip is configured to be connected to a wheel.

11. The suspension of claim 1, wherein the rubber bush is configured to be connected to a vehicle body.

\* \* \* \* \*